United States Patent
Attia

(10) Patent No.: US 9,512,286 B2
(45) Date of Patent: Dec. 6, 2016

(54) POLYETHYLENE AEROGEL AND METHOD OF PRODUCTION

(71) Applicant: Yosry A. Attia, Delaware, OH (US)

(72) Inventor: Yosry A. Attia, Delaware, OH (US)

( * ) Notice: Subject to any disclaimer, the term of this patent is extended or adjusted under 35 U.S.C. 154(b) by 0 days.

(21) Appl. No.: 14/700,387

(22) Filed: Apr. 30, 2015

(65) Prior Publication Data

US 2015/0247016 A1 Sep. 3, 2015

Related U.S. Application Data

(62) Division of application No. 13/483,475, filed on May 30, 2012, now Pat. No. 9,034,934.

(51) Int. Cl.
*C08J 9/28* (2006.01)
*C08J 9/00* (2006.01)
*C08J 9/33* (2006.01)

(52) U.S. Cl.
CPC .. *C08J 9/00* (2013.01); *C08J 9/28* (2013.01); *C08J 9/33* (2013.01); *C08J 2201/0482* (2013.01); *C08J 2201/0524* (2013.01); *C08J 2205/026* (2013.01); *C08J 2323/04* (2013.01); *C08J 2323/06* (2013.01); *C08J 2323/08* (2013.01)

(58) Field of Classification Search
CPC .......... C08J 9/28; C08J 2201/0502; C08J 2201/0524; C08J 2205/026; C08J 2323/06; C08J 2323/12; C08J 2327/20; C08J 2331/04; D03D 15/00; Y10T 442/3325

See application file for complete search history.

(56) References Cited

U.S. PATENT DOCUMENTS

| | | | | |
|---|---|---|---|---|
| 7,691,911 B2* | 4/2010 | Lee | ............ | B29C 67/20 521/142 |
| 8,461,223 B2* | 6/2013 | Lee | ............ | C08J 9/28 521/142 |
| 2006/0116433 A1* | 6/2006 | Lee | ............ | B29C 67/20 521/142 |
| 2011/0086100 A1* | 4/2011 | Attia | ............ | A61K 9/5146 424/484 |

* cited by examiner

*Primary Examiner* — Irina S Zemel
(74) *Attorney, Agent, or Firm* — Mueller Law, LLC; Jerry K. Mueller, Jr.

(57) ABSTRACT

A method for making polyethylene aerogels, including high molecular weight aerogels, commences by in a hydrocarbon solvent (e.g., toluene or benzene) in which polyethylene is insoluble at room temperature, adding polyethylene to the solvent heated to a temperature at which said polyethylene is soluble to form a reaction mixture. A free-radical catalyst is added to the reaction mixture and the reaction mixture is held until the desired gelation of the polyethylene has been achieved. The reaction mixture is cooled to about room temperature; and the hydrocarbon solvent is replaced with a gas (e.g., $CO_2$ or air) to form the polyethylene aerogel. Optionally, the cooled reaction mixture can be contacted with an anti-solvent for polyethylene to replace the hydrocarbon solvent with the anti-solvent. Silica aerogel particles can be encapsulated in polyethylene aerogel by adding the particles to the polyethylene gelation reaction mixture.

6 Claims, No Drawings

POLYETHYLENE AEROGEL AND METHOD OF PRODUCTION

CROSS-REFERENCE TO RELATED APPLICATIONS

This application is a divisional application of U.S. Ser. No. 13/483,475 filed May 30, 2012, the disclosure of which is expressly incorporated herein by reference.

STATEMENT REGARDING FEDERALLY SPONSORED RESEARCH

Not applicable.

BACKGROUND

Aerogels are three-dimensional network of nanophase architecture composed of gas [usually air] and solid structure, with air [gas] to solid ratio of up to 99% by volume. Thus aerogels have high porosity, high specific surface area, and very low density. The entrapped motionless air [gas] in the pores is responsible for the high insulation [low thermal conductivity] of the aerogel materials. Aerogels can be made as large monolithic shapes, or micron/submicron size bodies, or any size and shape in between. The gas inside the aerogel nanostructures can be replaced [displaced] with other substances, such as, for example, pharmaceuticals, which then are released into the desired targets in a controlled manner.

Polyethylene is a non-polar material with many desirable properties. At ambient conditions, it is considered rather chemically inert, non-toxic, transitive of infra-red [IR] radiation, outstanding electrical insulating properties, such that its dielectric constant, and power factor are almost independent of frequency and temperature. It has also desirable mechanical properties.

Research, conducted to explore the possibility of preparation of novel polyethylene only aerogel materials, managed to create a novel methodology to manufacture polyethylene aerogels, which included preparation of polyethylene aerogels using standard polyethylene polymers [low and medium molecular weight (MW)] as aerogel precursors. Research proceeded to further develop this material to comply with multiple specifications [including radiometric, mechanical, thickness, as well as several other requirements]. It was then realized that preparation of thin [2-3 mm] and ultrathin [0.5-0.9 mm] aerogel sheets (using the standard polyethylene polymers), which is necessary for packaging of electronics, compromised radiometric and mechanical properties of the aerogel sheet. To solve this shortcoming, the research efforts obtained high density [HDPE] and ultrahigh molecular weight [UHMW] polyethylene polymeric precursors and proceeded to develop polyethylene aerogel sheets from these precursors to meet all the specifications and performance requirements for electronics and sensors applications.

These newly developed polyethylene aerogels may be considered as a platform technology for many other applications, including thermal, cryogenic, and sound insulation; sound frequency modulation, computer electronics, wide band antennas, membrane separations, filtration, as well as controlled release of encapsulated substances. Several product specifications, and performance criteria, such as mechanical, radiometric, insulation, and suitability for packaging of electronics, were met with outstanding results.

Broad Statement

A method for making polyethylene aerogels of high molecular weight commences by in a hydrocarbon solvent (e.g., toluene or benzene) in which polyethylene is insoluble at room temperature, adding polyethylene to the solvent heated to a temperature at which said polyethylene is soluble to form a reaction mixture. A free-radical catalyst is added to the reaction mixture and the reaction mixture is held until the desired gellation of the polyethylene has been achieved. The reaction mixture is cooled to about room temperature; and the hydrocarbon solvent is replaced with a gas (e.g., $CO_2$ or supercritical $CO_2$) to form the polyethylene aerogel. Optionally, the cooled reaction mixture can be contacted with an anti-solvent for polyethylene to replace the hydrocarbon solvent with the anti-solvent. Silica particles can be added to the initial reaction mixture.

DETAILED DESCRIPTION

Desired Polyethylene Aerogel Properties Include:
1—High thermal insulation [low thermal conductivity; in the range of 5-45 mW/m-K];
2—Integral and uniform micro and macro physical structure with adequate mechanical strength for handling;
3—The ability to produce very thin sheets [1-3 mm], and ultra-thin sheets [0.1-1.0 mm] encompassing 1 & 2 above;
4—Good radiometric properties, such that high radiation transmission through the aerogel is not impeded by reflection, scattering, or absorption of such radiation;
5—Ability to reversibly stick to other materials or other aerogel sheets in electronic packaging.
6—High electric sheet resistance.

Aerogel Preparation Strategy:

1-Gelation Mechanism:

Polyethylene is soluble in hot hydrocarbon solvents, such as, for example, toluene and benzene, but insoluble at ambient room temperature. The dissolution temperature of polyethylene in toluene increases with the starting polymer molecular weight. Dissolved polymer molecules in solution are then bridged together to form a three dimensional network that entrap the solvent inside them [i.e., liquid gel], which upon cooling to ambient temperature, becomes solid gel of polymer network enclosing liquid toluene solvent inside the pores. On removal of the liquid solvent from the gel network, the solvent is replaced with a gas [air or $CO_2$ gas for example] and forms a dry polyethylene aerogel.

Polymer gelation bridging is accomplished by a peroxide catalyst, such as, for example, benzoyl peroxide, that causes free radical reactions between the polymer molecules, when activated by heat or ultraviolet radiation energy. The overall reactions are believed to be as follows:

1—Peroxide catalyst activation:

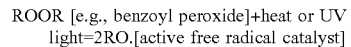
ROOR [e.g., benzoyl peroxide]+heat or UV light=2RO.[active free radical catalyst]

2—Initiation/polymer activation:

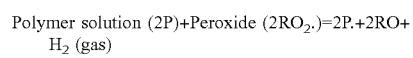
Polymer solution (2P)+Peroxide (2RO$_2$.)=2P.+2RO+ H$_2$ (gas)

3—Polymer-polymer bridging—Free radical termination:

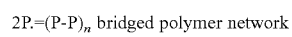
2P.=(P-P)$_n$ bridged polymer network

4—Catalyst decomposition:

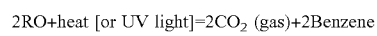
2RO+heat [or UV light]=2CO$_2$ (gas)+2Benzene

5—Hydrogen consumption:

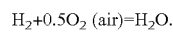
H$_2$+0.5O$_2$ (air)=H$_2$O.

6—Overall polymer-polymer bridging gelation Reaction:

$ROOR+2P+heat$ [or UV light]$=(P-P)_n$ polymer gel+ $CO_2$ (gas)+$H_2O$+2Benzene.

7—Gelation reactions by-products, benzene, water are removed from gel during supercritical drying, while $CO_2$ gas is released to atmosphere during gelation.

The duration of the active free radical catalyst is determined by the number of half life cycles [half life is the time required to decompose 50% of remaining catalyst in solution]. It is believed that 97% of benzoyl peroxide is decomposed after five (5) half life cycles, and 99% decomposed after (7) seven half lives. Half-life temperatures are: 10-hours at 73° C.; 1-hour at 92° C.; and 1-minute at 131° C. Thus, at a gelation reaction temperature of 130° C., 99% of catalyst is decomposed after about 7 minutes of reaction.

2—Thermal Insulation & Radiation Absorption:

Production of low-density aerogel would achieve both (a) low absorption of IR radiation, since absorption is a function of weight, (b) as well as increase thermal insulation due to higher pore volume/volume porosity. The goal of thermal insulation performance of these aerogels is to achieve a thermal conductivity, [K] in the range of 5-45 mW/m-K°.

3—Mechanical Strength:

From gelation equations, control of humidity in air and solvents and chemicals involved in the gelation process is vital to achieving more complete gelation linkages and better mechanical strength. Also, higher molecular weight polymers would afford more linkages and lead to better mechanical strength aerogels.

4—Thin and Ultra-Thin Aerogel Sheets:

These would be possible if 2 & 3 above are achieved.

5—Reflection and Scattering Minimization:

Reflection of radiation by polyethylene aerogels dried at pressures lower than 1300 psi was minimized by the use of solvent exchange with acetone, an anti-solvent for polyethylene. Polyethylene aerogels treated with the acetone anti-solvent prior to drying had excellent radiometric performance, e.g., very low reflectance, compared with those not treated with anti-solvent.

However, it was observed that improved radiometric characteristics of the 2 million MW polyethylene aerogels also was achieved by implementing better supercritical drying techniques at higher pressures [over 1500 psi] and lower temperatures as shown in Table 8.

A possible mechanism of lowering reflection of polyethylene aerogel using anti-solvent is believed to be through formation of nano-sized "bumps" or precipitates on the aerogel structure. These nano-size "bumps" are smaller than the light's wavelength, so that the surface acts as having a continuous refractive index gradient between air and the aerogel, which decreases reflection by effectively removing the air-aerogel interface.

Another possible factor is the removal of toluene from the gel through solvent exchange with acetone, and higher solubility of acetone in supercritical $CO_2$ fluid, leading to more thoroughly dried aerogel with minimal toluene residues.

6—Reversible Adhesion and Shrinkage Elimination of PE Aerogels:

This was a chance discovery from enhanced supercritical carbon dioxide drying of gels using higher pressure than "standard" practice, which also minimized or eliminated shrinkage of gels during drying.

DETAILED PREPARATIONS AND EXAMPLES

Procedure for Polyethylene Aerogel Production/Preparation

Preparation/Production of Polyethylene Aerogels Involves the Following Tasks:

1—Preparation and casting of gel solution.

2—Removal of excess free solvent from gel [optional].

3—Anti-solvent treatment of gels [optional].

4—Removal of entrapped solvent from gel to produce dry aerogels.

1—Preparation and casting of polyethylene gel solution:

1-1: Polymer dissolution:

In a typical preparation procedure, polyethylene solid powders or beads are dissolved in hot toluene solvent under reflux while being mechanically stirred in a glass pressure reactor. Electric heating tapes wrapped around the outside of the reactor and covered with an insulating sheeting material heat the reactor used in the laboratory preparations. The heating tape was controlled by a temperature controller, which was set at a predetermined temperature. Dissolution temperature was higher for higher molecular weight [MW] polymers and was around 130° C. for 2-6 million MW. Dissolution was continued until a clear polymer solution was obtained. The amount of polymer dissolved varied from less than 1% wt. for ultrahigh molecular weight [UHMW] to 10% or higher for low MW polymers, depending on desired final aerogel properties [for example, density & porosity] to be achieved.

1-2: Addition of Gelation Catalyst:

Gelation catalyst used in laboratory preparations was benzoyl peroxide, which was supplied at about 50% wt. powder mixture with phthalate to avoid explosive hazard during shipping by air. Warm/hot benzoyl peroxide solution was made by dissolving predetermined amounts in toluene and heated to a warm temperature. The amount of benzoyl peroxide was varied between 2-20% of the polyethylene polymer weight, but it was selected at the equivalent of 10% wt [20% including the phthalate powder] of the polyethylene weight for almost all of the preparations, unless stated otherwise. The catalyst solution was added to the clear polymer solution while mixing was continued under reflux at set temperature for 10 minutes, unless otherwise stated. The reaction product was the gel solution, which remained clear at the reaction temperature.

1-3: Casting Gel Solution:

Hot gel solution was poured out of the reactor by opening the reactor bottom valve into heated and leveled metal (stainless steel plate on aluminum base) or glass molds. All molds had glass covers with a center hole to allow reactor valve tube access to mold but keep hot solvent vapors from escaping. All heating and mixing units were switched off and gel was allowed to cool down in mold to room temperature. On cooling gel converted from solution to solid wet gel.

2—Removal of Free Excess Solvent from Gel:

Small amounts of excess free solvent that are not part of the gel structure [entrapped inside gel network] are removed from cooled gel body/sheet in the laboratory preparations by one or more of the following methods:

(a) Draining of solvent from casting mold;
(b) Partial air-drying at ambient conditions [slow evaporation];
(c) Partial forced air-drying at elevated temperatures [fast evaporation];

As discussed later, the need for this step may not be needed in future, as improvements in gel solution preparation are achieved to minimize or eliminate the presence of excess free solvent.

3—Anti-Solvent Treatment of Gels:

In an effort to improve the IR-radiometric properties of the polyethylene aerogels with regards to minimizing radiation reflection, the wet gels were treated with an anti-solvent. In this case, the anti-solvent of choice was acetone. Thus, the toluene-loaded gels were either transferred to and soaked in a bath of acetone for a period of time [0.5-2.0 hours], or sprayed in mold with acetone and kept soaking for a period of time. The resultant gels became snow white, and were taken to the final drying step.

4—Removal of Entrapped Solvent from Gel to Produce Dry Aerogel:

Wet gels were dried by both subcritical methods including ambient and forced air drying, and supercritical carbon dioxide solvent exchange in an autoclave. Tables 1-4 show both the aerogel preparation conditions and the resulting characteristics of those aerogels. The role of supercritical drying [and suggested further improvements] on the various properties of polyethylene aerogels are discussed later.

Results and Discussion:
Production of Polyethylene Aerogels:

Tables 1-8, show that polyethylene aerogels can be prepared by the methods described herein, with a range of performance characteristics. For example: aerogel density ranges from 0.6 g/cc to 0.01 g/cc or less; volume porosity range from 40% to over 99%; pore volume from 0.86 to over 80 cc/g; thickness from over 10 mm to less than 0.3 mm and all the way down to 0.007-0.028 mm [Gossamer aerogels]; mechanical properties from brittle, to tough, to very flexible; radiometric from unacceptably high reflectance, absorption, and scattering to very low values and excellent performance.

Additional properties achieved by discovery include polyethylene aerogel sheets with silky smooth feel and strong but reversible static cling, which obviated the need to use adhesives/glues to stick layers of sheets materials together in the packaging of electronic and sensor assemblies and, thus, improving overall performance and costs.

In achieving these results, many parameters and variables were identified, investigated and in many cases optimized. The main example parameters include:

1—Role of Humidity on Mechanical Strength of Polyethylene Aerogel:

Recognition of the possible deleterious effect of relative humidity in laboratory air and in solvents and chemicals used in preparation was made in early work with several attempts to add dehydrating reagents to ingredients in preparations but without much success. Finally, in later work, the use of anhydrous toluene, chemicals, and keeping laboratory air to below 40% [30-35%] at moderate room temperatures below 26° C. By avoiding humidity, the aerogels became much less brittle.

2—Role of Precursor Polymer Molecular Weight:

The results show that high [up to 1 million] and ultra high [2 million and above] polymer molecular weights are instrumental in improving mechanical strength, and making possible preparation of very thin aerogel sheets. In addition radiation scattering was improved.

3—Role of Anti Solvent on Radiometric Performance:

A chance discovery based on a hypothesis that polyethylene reflectance can be reduced by treating the wet toluene-laden gel sheets [or other shapes] in polyethylene anti-solvent, such as acetone, to exchange with and replace toluene in the gel structure. The first observation in the laboratory that acetone had an "opaquing, reflection lowering" effect on polyethylene[2 million] was made when the wet gel sheet turned "snow white" on soaking in acetone bath for 1-2 hours. However, the first successful preparation of 2M polyethylene aerogel sheet was made in later research, where marked improvement in aerogel reflection was made, compared with same aerogel made in earlier work, which was not treated with anti-solvent fluid exchange. All polyethylene aerogels thereafter were treated with acetone anti-solvent before drying with supercritical carbon dioxide. Table-5 shows examples of radiometric properties of polyethylene aerogels with and without anti-solvent treatment.

4—Role of Aerogel Density:

As expected, the results show that lowering aerogel density lowered radiation absorption, improved pore volume and porosity and, thus, improved insulation performance as well.

5—Role of Gel Drying Method:
Subcritical & Ambient Drying:

Table 1 A & B, show that subcritical and air drying can produce aerogels with a density range from 0.3-0.6 g/cc and a porosity range from 52% to 75%. Although subcritical including air drying methods can be used to completely remove the entrapped solvent to produce aerogels with adequate insulation performance, the micro physical structure is often non-uniform, and the mechanical and radiometric properties are far inferior to gels dried by supercritical carbon dioxide. Therefore, supercritical carbon dioxide solvent exchange was the method of choice for obtaining superior aerogels.

Drying with Supercritical $CO_2$ Fluid:

Supercritical drying did not automatically always yield expected results, however. It was thought that as long as supercritical conditions are employed, drying to perfect aerogels would result. Instead, gel shrinkage and other unexpected performance problems occurred. In later work, then, attention was paid to controlling the supercritical drying parameters, such as pressure, temperature, and continuous [dynamic] flow rate and time of supercritical carbon dioxide after the autoclave has achieved supercritical conditions. Thus, by increasing the pressure to 1400-1450 psi, at 35-37° C., and supercritical $CO_2$ flow for 20-30 minutes, no more shrinkage and superior products of 2M polyethylene aerogels were obtained. A similar observation on the beneficial use of higher pressure [1390 psi] than the normal 1250 psi with regards to shrinkage was made in earlier work, but its importance was not fully recognized at that time.

Relationship of Solubility of Solvents and Other Substances with Density of Supercritical Carbon Dioxide Fluid:

The importance of controlling supercritical pressure and temperature can be better understood by realizing that solubility of solvents, such as toluene, acetone, and alcohols, in supercritical carbon dioxide fluid is controlled by the density of the supercritical fluid, which is controlled by both the pressure and temperature. Therefore, better drying would be expected at the higher pressure and the corresponding temperature that enable the highest density of supercritical carbon dioxide [closer to the maximum of 0.8 g/cc].

Also, the amount of supercritical carbon dioxide fluid to completely dissolve the solvent [e.g., toluene, or acetone] is determined by the solvent's solubility [wt. %], and sufficient amount of supercritical $CO_2$ should be allowed to flow to achieve this.

Effect of Pressure and Temperature on Density of $CO_2$ Supercritical Fluid:

Table 6 shows the variation in density of supercritical carbon dioxide with pressure and temperature. These data were extracted from the $CO_2$ density-pressure phase diagram. From Table 6, it can be seen that in the pressure range 90-110 bar [1 bar=14.75 psi] there is almost a linear relationship between the change in density with pressure and temperature, while outside this pressure range, it is a non-linear relationship.

Effect of Pressure:

The density of $CO_2$ supercritical fluid ($\Delta D$) increases with increasing pressure ($\Delta P$) as follows:

$$\Delta D/\Delta P = 0.007 \pm (0.002) \text{ g/cc/bar};$$

Thus for 10 bar increase, the density increase is 0.07 (±0.02) g/cc.

Effect of Temperature:

The density of $CO_2$ supercritical fluid decreases with increasing temperature ($\Delta T$) as follows:

$$\Delta D/\Delta T = 0.0164 \pm (0.0018) \text{ g/cc/C.}°.$$

An Empirical correlation between substance solubility change ($\Delta S$) with a change in pressure and temperature of supercritical $CO_2$ fluid is as follows:

$$S_2 = 1.7 \times (d_2/d_1) \times S_1 \quad [1]$$

where $S_2$=Solubility at the higher pressure, $S_1$=Solubility at the lower pressure, $d_2$=Density of $CO_2$ at the higher pressure, $d_1$=Density of $CO_2$ at the lower pressure.

Conversely, solubility at the lower pressure in relation to that at higher pressure is as follows:

$$S_1 = 0.59 \times (d_1/d_2) \times S_2 \quad [2].$$

In each case, the density is calculated to account for the effects of both the pressure and temperature.

6—Formation and Removal of Excess Free Solvent from Gel:

The presence of excess free solvent [not included in gel structure] is believed to be due to:

A Use of reflux condenser during gelation, that returning condensed solvent [toluene] is excluded from participating in gel structure, and, B—Melting polymer gel at inside surfaces of reactor thereby releasing included solvent from its structure. Melting of polymer gel is a result of inefficient heat transfer from heating tape wrapped around reactor where the temperature is higher than the interior of gel solution, where the temperature is controlled. The amount of polymer lost for melting inside reactor is a function of gelation time, as shown in Table 7. Approximately 20-29% of the initial polymer is lost to melting in 10 minutes of gelation, while, 54-61% is lost during 30 minutes, and about 65% is lost during 60 minutes of gelation time.

Removal of excess free solvent is made by partial air-drying methods as explained earlier. However, to prevent the formation of excess solvent in the first place, one or more of the following steps should be taken:

1—Design better heat transfer mechanism, such as circulating temperature controlled heating oil around reactor;

2—More efficient mixing to transfer heat from outside of reactor to interior of gel solution;

3—Employ shorter gelation time inside reactor, but continue gelation reaction in the heated casting mold;

4—Convert reflux condensation to a distillation function during gelation period, by letting evaporated solvent to condense outside reactor into a special container, but stop distillation before gel solution becomes more viscous than desired for casting;

5—Reduce heating temperature during gelation to 70-80° C. to avoid excessive evaporation of solvent but only as long as polymer gel solution remains clear without polymer precipitation.

TABLE-1-A

Preparations of "Low Density" Polyethylene Aerogels [MW: K = 1000, M = 1 million]

| Preparation Date | Polymer MW | Polymer Conc., wt % | Reaction Temp., C. | Drying Method | Remarks |
| --- | --- | --- | --- | --- | --- |
| 11/24/ | 135K | 10 | 75 | Air dry | |
| 11/23/ | 135K | 5 | 75 | Air dry + subcritical $CO_2$ @ 54 C. & 670 psi | |
| 10/10-19/ | 135K | 5 | 110 | Air dry + supercritical $CO_2$ @ 1350 psi & 52 C. | |
| 10/10-19/ | 35K (a) | 5 | 110 | Same as above | |
| 10/10-19/ | 35K (b) | 5 | 110 | Air dry only | |
| 6/27/ | 135K + 4K [80:20] | 10 | 130 | Supercritical $CO_2$ @ 1310 psi & 52 C. | |
| 6/27/ | 135K + 35K [80:20] | 10 | 130 | Same as above | |
| 6/27/ | 135K+ 35K + 4K [80:10:10] | 10 | 130 | Same as above | |
| 9/28/ | 135K | 10 | 134 | Air dry, desiccator | 3" × 10" sheet, brittle |
| 9/30/ | 135K + 35K + 4K [80:10:10] | 10 | 130 | Same as above | [repeat 6/27/] |

TABLE 1-B

Performance Characteristics of Preliminary Polyethylene Aerogels

| Prepn. Date | Polymer MW | $T_h$, mm | D/L × W cm | $\rho_a$ g/cc | $V_p$ cc/g | $P_v$ % | [K] | [M] | [R] | Remarks |
|---|---|---|---|---|---|---|---|---|---|---|
| 11/24/ | 135K | 6-9 | 3.8 | 0.46 | 1.45 | 63.5 | 20 | G/U | U | Cracks, off white |
| 11/23/ | 135K | 5.7 | 5.7 | 0.30 | 2.49 | 74.9 | 20 | G | | white, no cracks |
| 10/10-19/ | 135K | 6 | 5.8 | 0.12 | 7.65 | 90.24 | | G | | |
| 10/10-19/ | 35K (a) | | 3.4 | 0.26 | 2.96 | 78.05 | | G | | |
| 10/10-19/ | 35K (b) | | | 0.62 | 0.84 | 51.83 | | | | |
| 6/27/ | 135K + 4K [80:20] | 8.9 | 4.5 | 0.27 | 2.87 | 77.5 | | U | U | poor |
| 6/27/ | 135K + 35K [80:20] | 10 | 4.5 | 0.2 | 4.3 | 83.75 | | U | U | |
| 6/27/ | 135K + 35K + 4K [80:10:10] | 12 | 4.9 | 0.2 | 4.17 | 83.3 | | U | U | |
| 9/28/ | 135K | 10 | 7.6 × 25.4 cm | 0.17 | 5.19 | 86.17 | | U | | brittle |
| 9/30/ | 135K + 35K + 4K; 80:10:10 | 10 | 5.7 | 0.17 | 4.95 | 85.6 | | U | U | Broke to pieces |

Insulation: [K] = Thermal conductivity [mW/m-K°]; Mechanical [M] & Radiometric [R] performances: Good = G; Unsatisfactory = U, Excellent = E.
Pore Volume, $V_p$, Volume Porosity = $P_v$, Apparent Density = $\rho_a$, Thickness = $T_h$, Dimensions: D = Diameter: Length × Width = L × W.

TABLE 2A

PREPARATION OF HIGH DENSITY AND ULTRA HIGH MOLECULAR WEIGHT [UHMW] POLYETHYLENE AEROGELS

| Preparation Date | Polymer MW* | Polymer conc., wt % | Solution Temp., C. | Drying Methods | Anti-solvent treatment | Remarks |
|---|---|---|---|---|---|---|
| 9/11-14/ | 300K | 5 | 110 | $CO_2$ Supercritical @1280 psi & 49° C. | No | dehydrating agent used, washed before drying |
| 9/11-14/ | 300K | 5 | 110 | Same as above | No | No dehydrating agent added |
| 10/2/ | 300K | 5 | 176 F. | $CO_2$ subcritical @970 psi & 63 C. | No | |
| 10/2/ | 2M | 5 | 135 | Same as above | No | Some shrinkage in desiccator |
| 10/3/ | 6M | 5 | 135 | CO2 supercritical | No | |
| 11/9-12/ | 2M [3" × 10"] | 5 | 135 | Supercritical | No | ~50% shrinkage |

TABLE 2B

Aerogel Characteristics & performance

| Preparation Date | Polymer MW | $T_h$, mm | D/L × W cm | $\rho_a$, g/cc | $V_p$, cc/g | $P_v$, % | Remarks |
|---|---|---|---|---|---|---|---|
| 9/11-14/ | 300K | 6-8 | 4.2 | 0.075 | 12.50 | 93.75 | Good white monolith |
| 9/11-14/ | 300K | 6 | 3.2 | 0.097 | 9.48 | 92.0 | Good white monolith |
| 10/2/ | 300K | 10 | 4.9 | 0.096 | 9.58 | 92.0 | good |
| 10/2/ | 2M | 5 | 3.7 | 0.34 | 2.11 | 71.74 | Good, shrinkage, yellowish |
| 10/3/ | 6M | 13 | 4.7 | 0.124 | 7.23 | 89.67 | Very good |
| 11/9-12/ | 2M | 3 | 13.6 | 0.284 | 2.69 | 76.3 | Intact, pliable |

Pore Volume = $V_p$, Volume Porosity = $P_v$, Apparent Density = $\rho_a$, Thickness = $T_h$, Dimensions: Diameter = D; Length × Width = L × W.

TABLE 3A

PREPARATION OF ULTRAHIGH MOLECULAR WEIGHT POLYETHYLENE AEROGELS

| Preparation Date | Polymer MW | Polymer conc., wt % | Solution Temp., C. | Drying Methods | Anti-solvent? | Remarks |
|---|---|---|---|---|---|---|
| 12/10-11/ | 2M [3 × 10"] | 5 | 126 | supercritical + air dry | No | Shrinkage [7.75 × 2.5"] |
| 7/18/ | 2M [4 × 12"] | 2.5 | 126 | Subcritical @770 psi | No | |
| 9/6-11/ | 2M | 2.8 | 130 | Supercritical @1380 psi &56 C., 2 runs | No | Almost No shrinkage |
| 10/15-19/ *Anti-solvent treatment *Anhydrous Toluene use | 2M [19 × 8"] | 2.1 | 128 | Air + supercritical | Yes [30 min] | Transparent gel became white when soaked in anti-solvent. Shrinkage only after air dry to [10 × 5"] |
| 12/1-5/ | 2M [25" × 4"] | 2.0 | 130 | Air dry + supercritical | Yes | Shrinkage by air drying |
| 5/7-8/ | 2M [4 × 12"] | 2.14 | 130 | Air dry + supercritical | Yes | |
| 6/9-11/ | 2M [4 × 12"] | 1.7 | 126 | Air dry + supercritical @1280&42 C. | Yes | |
| 7/15-17/ | 2M [4 × 12"] | 0.96 | 129 | Air dry + supercritical @1290&45 C. + scCO$_2$ flow 6 minutes | Yes | Excellent very small shrinkage |
| 7/21-22/ | 6M [4 × 12"] | 0.95 | 129 | Air dry + supercritical @1290&45 C + scCO$_2$ flow 6 minutes | Yes | Excellent no shrinkage |
| 8/5-6/ | 6M [4 × 12"] | 1.2 | 130 | Air dry + supercritical @1290&45 C. + scCO$_2$ flow 6 minutes | Yes | Very good |

TABLE 3B

Aerogel Characteristics & Performance

| Preparation Date | Polymer MW | $T_h$, mm | L × W cm | $\rho_a$ g/cc | $V_p$, cc/g | $P_v$, % | Remarks |
|---|---|---|---|---|---|---|---|
| 12/10-11/ | 2M [3 × 10"] | 7 | 19.7 × 6.35 | 0.195 | 4.3 | 83.79 | Very good |
| 7/18/ | 2M [4 × 12"] | 25 | 21.65 × 6.5 | 0.3 | 2.5 | 75 | good |
| 9/6-11/ * No Anti-solvent use | 2M | 17 | 4.5 | 0.34 | 2.11 | 71.86 | Good, but high reflectance |
| 10/15-19/ *Anti-solvent treatment *Anhydrous Toluene use | 2M [19 × 8"] | 4 | 24.13 × 6.35 | 0.417 | 1.57 | 65.26 | Very good mechanical and improved radiometric properties. Lower reflectance |
| 12/1-5/ | 2M [25" × 4"] | 3.5 | 24.77 × 11.43 | 0.40 | 1.67 | 66.68 | good |
| 5/7-8/ | 2M [4 × 12"] | 2.8 | 21.5 × 6.2 | 0.26 | 3.01 | 78.34 | Some shrinkage, good mech., not uniform |

TABLE 3B-continued

Aerogel Characteristics & Performance

| Preparation Date | Polymer MW | $T_h$, mm | L × W cm | $\rho_a$ g/cc | $V_p$, cc/g | $P_v$, % | Remarks |
|---|---|---|---|---|---|---|---|
| 6/9-11/ | 2M [4 × 12"] | 1.0 | 27.5 × 9 | 0.097 | 9.17 | 91.67 | Very white, uniform, flexible, best to date |
| 7/15-17/ | 2M [4 × 12"] | 4 | 27 × 8.5 | 0.043 | 22.43 | 96.44 | Excellent, flexible |
| 7/21-22/ | 6M [4 × 12"] | 2 | 29.6 × 7.9 | 0.037 | 26.2 | 96.94 | Excellent |
| 8/5-6/ | 6M [4 × 12"] | | | 0.047 | 20.45 | 96.10 | Very good |

TABLE 4A

Preparation of Very Thin And Ultrathin Polyethylene Aerogels

| Preparation Date | Polymer MW | Polymer Conc., wt % | Solution Temp., C. | Drying Method | Anti-solvent? | Remarks |
|---|---|---|---|---|---|---|
| 8/12-14/ | 6M [0.9 mm] | 1.06 | 130 | Air [18 hr.] + supercritical | Yes | |
| 8/25-28/ | 6M [0.8 mm] | 1.3 | 131 | Air + autoclave + flow | Yes | |
| 10/9-10/ | 6M [Std] | 1.05 | 130 | Same as above | Yes | |
| 10/9-10/ | 6M [skin] | 1.05 | 130 | Same as above | Yes | Short air drying [<1 hr.] |
| 4/6-8/ | 2M | 0.71 | 133 | Air [12 hr] + supercritical | Yes [2 hr] | |
| 4/13-16/ | 2M | 0.7 | 127 | same | Yes | Squeeze Gel between 2 glass sheets |
| 4/14-16/ | 6M | 0.71 | 130 | Air [7 hr] + supercritical | Yes | Squeeze gel |
| 4/21-23/ | 6M | 0.71 | 130 | Air [7 hr] + supercritical | Yes | No squeeze |
| 5/26-27/ | 2M [Gossamer] | 0.71 | 130 | Air [1 hr warm hair dryer + 1 hr ambient] + supercritical | Yes | Squeeze |
| 6/30-7/2/ | 2M [std] | 1.09 | 128 | Air [5.5 hr] + supercritical | Yes | Some shrinkage |
| 7/7-10/ *Higher pressure, low temp [high density of sc $CO_2$] | 2M [std = 2.5 mm] | 0.9 | 129 | Air [7.5 hr] + supercritical @ 1400 psi& 35 C. | Yes | No shrinkage |
| 7/14-18/ | 2M [std] | 0.9 | 129 | Supercritical @ 1400 psi & 37 C. | Yes | Excellent No shrinkage |
| 8/26-28/ | 2M | 0.76 | 129 | Air [1 hr] + supercritical | Yes | Thin sheets stick to supports |
| 9/21-23/ | 2M | 0.48 | 129 | Air [40 min] + supercritical | Yes [40 min] | Simultaneous acetone spray and air dry, no squeeze, stick to support |
| 10/7-9/2009 | 2M | 0.29 | 129 | Air [1.5 hr] + supercritical | Yes | |

TABLE 4B

Characteristics and Performance of Polyethylene Aerogels

| Preparation Date | Polymer MW | Thickness $T_h$, mm | Dimension L × W cm | Density $\rho_a$, g/cc | Pore volume $V_p$, cc/g | Porosity $P_v$, % vol | Remarks |
|---|---|---|---|---|---|---|---|
| 8/12-14/ | 6M | 0.94 [0.9 mm] | 29.33 × 9.03 | 0.16 | 5.42 | 87.2 | Good, not uniform |
| 8/25-28/ | 6M | 0.6 [0.8 mm] | 26 × 10 | 0.19 | 4.49 | 84.34 | good |
| 10/9-10/ | 6M [Std] | 3.8 [.36-.85] | | 0.044 | 21.9 | 96.4 | Very flexible, excellent |
| 10/9-10/ | 6M [skin] | 1.03 | | 0.058 | 16.4 | 95.0 | Very flexible, excellent |
| 4/6-8/ | 2M | 1.2 | 30 × 8 | 0.061 | 15.84 | 95 | good |
| 4/13-16/ | 2M | 0.44 | 28 × 11 | 0.105 | 8.69 | 91.26 | Good, flexible |
| 4/14-16/ | 6M | 0.52 | 26 × 8.8 | 0.16 | 5.26 | 86.2 | Good, flexible |
| 4/21-23/ | 6M | 0.89 | 29.6 × 10.6 | 0.087 | 10.66 | 92.73 | Good, flexible |
| 5/26-27/ | 2M [Gossamer] [micro-thin] | 0.04 | 28.3 × 10.5 | 0.59 | 0.86 | 51 | Excellent mechanical, flexible, transparent |
| 6/1-3/ | 2M [Gossamer] [7-40 micron] | 0.02 [0.007-0.047] | | 0.76 | 0.48 | 45.0 | Excellent mechanical, flexible, transparent, |
| 6/30-7/2/ | 2M [std] | 2.1 [average] | | 0.075 | 12.5 | 94.0 | Flexible, very good |
| 7/7-10/ *Higher pressure, low temp [higher density of sc $CO_2$] | 2M [std = 2.5 mm] | 3.9 | 30.23 × 9.2 | 0.022 | 44.12 | 98.2 | Excellent very white, no shrinkage |
| 7/14-18/ | 2M [std] | 4.0 | 29.6 × 8.8 | 0.027 | 36.2 | 97.8 | Spectacular |
| 8/26-28/ * Tacky, self adhesive, static cling | 2M | 0.3 | | 0.069 | 13.66 | 94.25 | Very flexible, excellent, repeat 9/2-4/09 [tacky], static cling |
| 9/21-23/ *self adhesive, static cling | 2M | 0.5 | 27 × 11.1 | 0.044 | 21.9 | 96.3 | Tacky flexible, self adhesive |
| 10/7-9/ *self adhesive, static cling | 2M | 0.5 [±0.05] | 27.4 × 11 | 0.026 | 37.63 | 98.0 | Static cling, excellent, very soft, tacky feel, sticks to objects |

TABLE 5

Examples of Intrinsic Radiometric Characteristics of some Polyethylene Aerogels

| Preparation Date | Polymer MW | Thickness mm | Density g/cc | Remarks on Radiometric characteristics |
|---|---|---|---|---|
| 10/7-9/* | 2M | 0.5 | 0.026 | Excellent, Best ever |
| 7/7-10/* | 2M | 3.9 | 0.022 | Very good, Best to date |
| 10/15-19/* | 2M | 4.0 | 0.417 | Good improvement |
| 9/11/** | 2M | 4.2 [3.1-5.3] | 0.27 | Not good |
| 9/11-14/** | 300K | 6.0 | 0.097 | Not good |
| 10/21** | 300K | 10.0 | 0.096 | Not good |

*Anti-solvent treatment applied;
**Anti solvent treatment NOT applied.
Radiometric Characteristics include: Absorption Coefficient, α/unit length; Back Scattering Coefficient, β; Forward scattering, δ; Reflection %.

TABLE-6

Density (g/cc) of supercritical Carbon dioxide at Various Temperatures and Pressures Derived from $CO_2$ Density-Pressure Phase Diagram. [Maximum Density of Supercritical $CO_2$ = 0.80 g/cc]

| Pressure, Bar [PSI]* | 32° C. | 37° C. | 40° C. | 47° C. | 57° C. |
|---|---|---|---|---|---|
| 80 [1180] | 0.52 | 0.29 | | 0.23 | 0.20 |
| 90 [1327.5] | 0.68 | 0.60 | | 0.38 | 0.22 |
| 100 [1475] | 0.76 | 0.68 | 0.632 | 0.52 | 0.32 |
| 110 [1622.5] | 0.78 | 0.71 | | 0.56 | 0.40 |
| 120 [1770] | 0.79 | 0.76 | | 0.60 | 0.49 |

* 1 Bar = 14.75 PSI. [Density @ 31° C. & 1070 psi [72.5 Bar] = 0.469 g/cc].

TABLE-7

Polymer Weight Loss during Gelation Reactions of Polyethylene [2M] Gels

| Preparation Date | Reaction Time, Minutes | Polymer weight loss Wt % | Initial Polymer solution Conc., Wt % | Final polymer solution Conc., Wt % | Dry Aerogel Density, g/cc |
|---|---|---|---|---|---|
| 5/14-15/ | 10 | 29.0 | 1.6 | 1.14 | 0.27 |
| 5/27/ | 10 | 20.0 | 1.6 | 1.28 | 0.4 |
| 6/2-4/ | 30 | 54.4 | 1.6 | 0.73 | 0.124 |
| 6/9-11/ | 30 | 61.4 | 1.6 | 0.62 | 0.11 |
| 6/16-18/ | 60 | 64.5 | 1.6 | 0.57 | 0.079 |

TABLE 8

Preparation of 2M MW Polyethylene Aerogels

| Preparation Date | Initial Polymer concentration, wt. % (final) | Maximum pressure in autoclave, psi | Aerogel Dimensions, cm | Aerogel Density, g/cc | Pore Volume, cc/g | Volume Porosity % | Remarks |
|---|---|---|---|---|---|---|---|
| 8/15-18/ | 0.9 (0.54) | 1500 | 3 sheets: 23.5-27 × 6.67-7.9 × 0.115-0.2 | 0.24-0.0485 | 23.6-40.83 | 96.0-98.0 | Acetone treatment |
| 8/23-25/ | 0.92 | 1450 | 4 sheets: 26.1-28 × 8.0-8.4 × 0.23-0.27 | 0.0245-0.032 | 30.4-34.9 | 97.3-98.0 | Acetone treatment |
| 9/13-15/ | 0.92 | 1650 | 26.9 × 9.8 × 0.24 | 0.032 | 31.425 | 97.42 | Acetone treatment |
| 9/19-20/ | 1.04 | 1700 | 4-sheets average; | 0.02 | 51.8 | 98.4 | No more acetone treatments, white, silky touch, static cling, good radiometric performance |
| 10/20/ | 0.95 | 1650-1700 | 36.3 × 29.3 × 0.33 | 0.0195 | 49.17 | 98.3 | First large sheet 12" × 15" |
| 11/8-10/ | 0.95 | 1700 | 32.5 × 26.7 × 0.448 | 0.02 | 49.17 | 98.3 | 13" × 10.7" sheet |
| 11/17/ | 0.95 | 1650 same day drying | 31.9 × 26.1 × 0.5 | 0.021 | 47.7 | 98.3 | Flawless sheet |
| 11/23-24/ | 0.67 | 1700 | Sample; 5.5 × 4.9 × 0.11 | 0.0236 | 41.54 | 98.0 | |
| 12/12/ | 0.67 (0.62) | 1700 | Sample; 7.5 × 3.0 × 0.134 | 0.0166 | 59.4 | 98.6 | Sheet tore to pieces |
| 12/13/ | 0.62 | 1700, same day | Sample; 2.8 × 4.8 × 0.19 | 0.012 | 82.5 | 99.0 | First record; not integral sheet, lots of holes |
| 1/04/ | 0.60 | 1600, same day | Sample; 6.4 × 3.8 × 0.28 | 0.021 | 47.7 | 98.3 | 4-holes in sheet |
| 1/10/ | 0.58 | 1700, same day | 22.5 × 30 × 0.35 | 0.013 | 73.5 | 98.9 | 9" × 12" sheet |
| 2/17/ | 0.29 | 1700, same day | Sample #2; 3.2 × 4.6 × 0.28; samples #1, 2, 4 | 0.0097 0.014-0.016 | 102.26 62-72 | 99.20 98.7-98.9 | Record porosity & density |

Encapsulation of Silica Aerogel Particles in Polyethylene Aerogel

Procedures:

A Silica aerogel powder: silica alcogel was made by mixing silica alkoxide, water, and hydrofluoric acid catalyst at 45° C. The alcogel was micronized with a blender and sieved on 140 mesh [105 microns]. The micronized gel particles were dried by $CO_2$ supercritical method in an autoclave.

B—Encapsulation in polyethylene aerogel: 5 grams of 2 million MW polyethylene powder was dissolved in 630 ml hot toluene. Silica aerogel powder [80 ml] was mixed with the hot polyethylene toluene solution and 1.5-gram benzoyl peroxide catalyst was added to form gel solution. The gel solution was poured in a mold forming a thin layer of polyethylene gal enclosing the silica aerogel particles. On drying by $CO_2$ supercritical method, an aerogel sheet was obtained as shown in Table 9.

TABLE 9

Ultra Thin Sheets of Polyethylene (MW-2 million) Aerogel Encapsulating Silica Aerogel Particles (<100 mesh, 150μ) at 90% Volume Silica Aerogel to 10% Volume Polyethylene Aerogel

| Preparation Date | Thickness (mm) | Dimensions (L × W, cm) | Aerogel Density (g/cc) | Pore Volume (cc/g) | Volume Porosity (%) | Remarks |
|---|---|---|---|---|---|---|
| 8/2-23/ | 0.74 | 21 × 11 | 0.123 | 7.74 | 95.2 | Very good, flexible sheets encapsulating silica aerogel particles |

Radiometric and Electric Properties of Silica Aerogel-PE Aerogel Sheets:

These sheet wafers were tested for wide band antenna applications. The test results showed that the silica aerogel-PE aerogel wafer had a sheet resistance of 250 million Ohms per square. This is much [25 thousand to 50 thousand times] higher than previously obtained by other semiconductor resistors of 5-10 thousand ohms per square. This type of aerogel sheet wafers is very promising not only for thermal sensing the w-band and infra-red [thermal insulation], but also for its very high electric resistance [very low dielectric constant]. The silica aerogel-PE aerogel wafers also had refractive index, q, between 1.01-1.09 for the wavelength between 8-14 microns, and extinction coefficient, K, between 0.0096-0.0104 for the same wavelength range.

I claim:

1. A polyethylene polymer or copolymer aerogel.
2. The aerogel of claim 1, which has a molecular weight between about 1 million and about 6 million.
3. The aerogel of claim 1, having a density ranging from about 0.6 g/cc to about 0.01 g/cc and a porosity ranging from between about 40% to about 99%.
4. The aerogel of claim 3, having a density below about 0.01 g/cc and a porosity of greater than 99%.
5. The aerogel of claim 1, in sheet from having a thickness ranging between about 0.3 mm and about 10 mm.
6. The aerogel of claim 1, having therein encapsulated silica aerogel.

* * * * *